Patented Oct. 23, 1934

1,977,945

UNITED STATES PATENT OFFICE 1,977,945

FOOD PRODUCT AND PROCESS OF PRODUCING THE SAME

Eloise Jameson, Corona, and Clarence P. Wilson, Ontario, Calif., assignors to California Fruit Growers Exchange, Los Angeles, Calif., a corporation of California No Drawing. Application June 17, 1932, Serial No. 617,918

7 Claims. (Cl. 99—5)

Our said invention relates to a food product and process of producing the same and it is an object thereof to produce a dry, relatively non-hygroscopic food product containing fruit juice solids.

Another object of our invention is to provide a means and method for producing a food or beverage product or the like containing fruit juice solids in a dry relatively non-hygroscopic form.

A still further object of our invention is the employment of pectin to produce the results hereinbefore and hereinafter described.

It has long been recognized that if fruit juices could be reduced to a dry readily soluble form while at the same time retaining their fine flavors and healthful food properties a valuable new contribution would be made to the art of preparing food and beverage products. Heretofore quite a number of attempts have been made to achieve this result. Many of these attempts have been out and out failures. A few have been moderately successful. It has not, however, heretofore been possible to produce by a method commercially feasible and operatable a product free from commercial objections.

The attempts referred to have been largely based upon the use of a drying aid of some nature. If such substances were not used the resulting product was not a powder or if obtained as a powder it was so hygroscopic as not to be useful under ordinary conditions. This is a natural characteristic of practically all fruit juices. Those juices contain a high proportion of sugars which are highly hygroscopic in their character. It has heretofore been proposed to dry such fruit juices by the incorporation therein of large amounts of sugar or starch or glucose. Such products to be at all commercially satisfactory must be carefully protected from the atmosphere, as, for example, in friction top cans, and even when so protected and in a container which is opened only at the rarest intervals the product will eventually settle down into a solid glass, which would seem to indicate that it has never been a true powder at all.

We have found that a much better result is had and a much higher concentration of fruit juice solids is obtained if, before drying, there is dissolved in the juice a suitable proportion of pectin, as this has the effect of reducing very appreciably the hygroscopicity of the resulting powdered product. The product will, in fact, be substantially non-hygroscopic under all normal conditions. We have found that pectin is peculiarly and particularly satisfactory for the production of a dry fruit juice solids product in accordance with our invention. We have also found that the drier the product is the better it retains the natural flavor of the fruit juice and for this reason we prefer that the product should contain not over 4% of moisture, a smaller proportion, say less than 1%, being preferred. The particular proportion of moisture will, of course, to some extent depend upon the method of drying. This will be referred to later.

It has likewise been proposed heretofore, specifically in U. S. Patent No. 1,800,501 to von Bornegg, to dry fruit juices and the like, such as citrus juices, as, for example, by spray drying, for the purpose of producing therefrom dry powders by the use of, broadly, edible gum-like hydrophilic colloids, and specifically gum arabic. Now we have found that by the use of edible gum-like hydrophilic colloids in general and specifically by the use of gum arabic, it is possible to produce fruit juice solids in dry form. It is necessary, however, when employing gum arabic in accordance with the disclosures of Patent No. 1,800,501, to employ a percentage of the drying aid at least five times as great as the percentage of pectin which we have now discovered to be satisfactory.

The great importance of this difference will be appreciated when it is considered that one of the objects of our invention is to supply consumers with fruit juice solids in concentrated form and as free as possible from any foreign or added substances. In addition to this, such a very large proportion of drying aid in the product becomes objectionable in the use of the powder, as, for example, in making up a beverage. There is also involved the matter of the increased amount of the final product which necessitates an increased size of packages and increased cost of shipment of materials which in and of themselves are not desired in the final product but are there merely to preserve the fruit juice solids in the desired form.

Another important characteristic of pectin, and one which makes it decidedly advantageous in connection with this invention, is the fact that pectin can be and is produced as a standard and standardized article of commerce. When, for example, a quantity of 160 grade pectin is ordered from a dealer the purchaser, being familiar with the product, knows exactly what he will get and what results to expect from it. He knows that the proportion of pectin which will give him a desired result will be exactly the same as that proportion of pectin from a previous lot which gave the results sought. Gum arabic, on the other hand, is not thus standardized in commerce and it is, as a practical fact, a matter of very great difficulty to secure from time to time different lots of gum arabic which are uniform as to any particular characteristic or even in general uniformity and color. This lack of uniformity in gum arabic is very much in evidence with regard to the particular characteristic that is of interest to us, namely, its efficacy as a drying aid. This is a matter of a very real commercial importance. The user of pectin may carry on his operation with standardized operations and standardized formulas, at all times using only the minimum amount of pectin necessary to give the desired result. The user of gum arabic, on the other hand, must either make a series of tests on each separate lot or must employ a large excess from practically all lots in order to avoid failures when he chances upon a lot low in drying promoting abilities. Even then he will have failures from time to time unless he uses a proportion of gum arabic which with practically all lots would be vastly in excess of the minimum amount needed.

We have likewise discovered that in a similar manner pectin is distinctly more efficacious than others of the edible gum-like hydrophilic colloids referred to by the von Bornegg patent. We therefore prefer to employ pectin. Pectin has an additional advantage in this regard which upon reflection will be seen to be a very great advantage from a commercial standpoint, namely, that it is a natural ingredient of the fruit juices generally and it therefore is not a foreign or extraneous ingredient as are all of the other materials particularly referred to.

We are not able to state with certainty just why pectin is superior to other gum-like hydrophilic colloids such as, for example, agar-agar, gelatin, gum arabic and gum tragacanth, but this is a fact readily observed by the experimental operator. It is to be noted, however, that pectin is able to form with acid, aqueous material and solids of fruit juices and/or sugar a certain definite type of jelly and, moreover, that pectin requires the presence of the acid, the aqueous material and the soluble solids for the production of this particular type of jelly. This is not true of the other gum-like hydrophilic colloids referred to. It has, moreover, been noted that fruit juice dried with pectin as a drying aid in accordance with our invention, as herein described, actually goes through a stage of jelly formation and that as the drying progresses this jelly becomes desiccated. Evidently the material actually recovered is in the form of a desiccated pectin jelly containing the natural fruit acid, sugars, flavors, etc. Obviously, therefore, in the drying of natural fruit juices with pectin as a drying aid there is presented a new mode of operation.

If it is desired to do so, a proper proportion of any desired sugar used for its sweetening effect or any other sweetening or flavoring ingredients, such as essential oils, may be incorporated in the juice before dehydration and these ingredients will thus become a part of the homogeneous dehydrated product consisting essentially of a desiccated pectin jelly and the product will have the desired taste and flavor as well as the essential property of being relatively non-hygroscopic, so that it can readily be handled and used under ordinary atmospheric conditions.

While the product is usually kept in powdered form for convenience, and while it can readily be kept in that form, it is not necessary or essential to do so, since it can be made into capsules, tablets, etc., of any desired size and shape and thus will be in the desired convenient form for the use of travelers, etc.

While the principle of the invention is applicable to any fruit juice, the production of a dehydrated lemon juice powder by this process will be described as a specific example for a better understanding of the invention.

1000 kg. of lemon juice containing usually about 100 kg. of dissolved lemon juice solids (viz. citric acid, sugars, mineral salts, etc.) are put into a mixing tank and 2 to 4 kg. of pectin (approximately 2% to 4% of the lemon solids present) are dissolved in the juice or a solution containing this amount of pectin may be stirred into the juice. The proportion of pectin indicated is that which we have found preferable. Where it is desired to increase the effect of the pectin, an increased proportion may, of course, be employed, always bearing in mind the use to which the final product is to be put and the proportions of the various ingredients desirable for that use.

10 kg. or any other desired proportion of any suitable sugar such as sucrose, glucose, dextrose, lactose, etc., is added to the solution and dissolved therein. The entire mixture, after being rendered substantially homogeneous by stirring, may be dehydrated by means of a spray drier, a vacuum drier or any other suitable drying or dehydrating apparatus or equipment. Of the sugars indicated we particularly prefer to employ lactose since we have found this sugar to be distinctly efficacious in this relationship. Without dwelling upon or expanding this point further by the inclusion of unnecessary details we merely wish to indicate here that we regard the combined effect of pectin and lactose as a drying aid, as a novel and distinctly important contribution to the art of producing substantially non-hygroscopic fruit juice solids.

If 4 kg. of pectin and 10 kg. of lactose are used the powdered product will contain:

| | |
|---|---|
| Lemon solids | 87.7% |
| Lactose | 8.8% |
| Pectin | 3.5% |

As another specific application of the process, and using orange juice as an example of the fruit juice, we may put 1000 kg. of orange juice into the mixing tank. A typical analysis for such orange juice might be; soluble solids 13.2%, anhydrous citric acid 1.26%. This gives for the batch 132 kg. orange juice solids of which 12.6 kg. are citric acid. Then, to illustrate the employment of cane sugar, which may be used in connection with our invention, we would prefer that enough cane sugar should be added so that the ratio of total solids to acid is 18:1 or for each part of acid there should be present 18 parts solids, making a total of 226.8 kg. of solids. In order to have present the 2% of pectin which we regard as a minimum in the powdered product, it would then be necessary to add 4.63 kg. of dry pectin. In order to bring this pectin into solution it will be suitable to reserve a small portion of the sugar such as, for example, about 12 or 15 kg. and mix it throughly with the pectin. This mixture may then be sifted into the juice, the pectin and sugar being thoroughly dissolved by stirring.

The solution is then to be reduced to a dry form by any suitable means. We prefer to use a spray drier which gives directly a fine dry relatively non-hygroscopic powder. By the expressions "relatively non-hygroscopic" and "substantially non-hygroscopic" we means to indicate a powder sufficiently non-hygroscopic to be handled under ordinary atmospheric conditions without forming lumps that are hard to dissolve, and without becoming gummy. The expression "practically dry" may be used with a similar significance.

The composition of the dried orange powder described would be:

Orange juice solids ---------------------- 57.0%
Cane sugar ------------------------------- 41.0%
Pectin ------------------------------------ 2.0%

Whatever method of drying may be employed the drying should preferably be rapid and at a relatively low temperature, as in spray drying, so as to retain not only the natural flavor of the fruit juice but the vitamin value and other therapeutic values which are among the particularly valuable characteristics of fruit juices, especially orange and lemon juice.

We would particularly point out that sugar when added to the mixture of fruit juice solids and pectin has the advantage of aiding the drying operation in addition to the sweetening quality of the sugar. In our first reference to sugar above we merely intended to imply that the flavor of the final product may be suitably altered by the incorporation of any additive ingredient not having a harmful action insofar as inhibiting drying is concerned. Where again we refer to the addition of certain specific sugars, and particularly lactose, we have in mind the fact that less pectin may be used when sugar, as preferably in the form of lactose, is added. The fact is that the inclusion of sugar changes the eutectic point of the mixture in such a way that drying occurs satisfactorily at considerably lower concentrations of pectin.

While the term "powder" is used herein for convenience it is to be understood that equivalent solid forms of substantially non-hygroscopic desiccated materials, e. g., granular or flaky, etc., are within the scope of the invention. The form of the final product will in part depend upon the method of drying. Vacuum drum driers, for example, will yield a product which is primarily flaky.

This application is a continuation in part of application Serial No. 161,463 originally executed by Eloise Jameson, Earl D. Stewart and Clarence P. Wilson, and filed in the United States Patent Office on January 15, 1927.

Having thus fully described our invention, what we claim as new and desire to secure by Letters Patent, is:

1. A process of producing dehydrated fruit juice products that includes the steps of adding a quantity of pectin to the fruit juice product and subsequently desiccating the mixture.

2. A food product comprising a practically dry and relatively non-hygroscopic mixture of fruit juice solids and pectin.

3. A food product comprising a practically dry and relatively non-hygroscopic mixture of citrus fruit juice solids and pectin.

4. A dry food product comprising citrus fruit juice solids pectin and lactose, in a dry relatively non-hygroscopic condition.

5. A dry food product comprising fruit juice solids, pectin and a commercial sugar, the proportion of pectin being at least as small as 4% and the proportion of sugar being at least as small as 50%, said product being in form satisfactory for packaging and distribution as a dry product.

6. A dry, relatively non-hygroscopic food product comprising fruit juice solids, pectin and lactose and consisting essentially of a desiccated pectin jelly.

7. A process of producing dehydrated fruit juice products that includes the steps of adding a quantity of pectin to a fruit juice product, atomizing and desiccating the mixture in such a way as to cause it to go through a stage of formation of particles of pectin jelly, and continuing the desiccation until the particles are substantially dry.

ELOISE JAMESON.
CLARENCE P. WILSON.